US007177644B2

(12) United States Patent
Smith et al.

(10) Patent No.: US 7,177,644 B2
(45) Date of Patent: Feb. 13, 2007

(54) DISTRIBUTED MULTI-BEAM WIRELESS SYSTEM

(75) Inventors: Adrian Smith, Kanata (CA); David Steer, Nepean (CA); Koon Hoo Teo, Nepean (CA); Kris Ng, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 370 days.

(21) Appl. No.: 10/682,084

(22) Filed: Oct. 10, 2003

(65) Prior Publication Data

US 2004/0157611 A1   Aug. 12, 2004

Related U.S. Application Data

(60) Provisional application No. 60/454,715, filed on Mar. 15, 2003, provisional application No. 60/446,619, filed on Feb. 12, 2003.

(51) Int. Cl.
*H04Q 7/20* (2006.01)
*H04Q 7/00* (2006.01)
*H04M 1/00* (2006.01)

(52) U.S. Cl. ............... 455/445; 455/450; 455/515; 455/517; 455/509; 455/510; 455/41.2; 370/329; 370/341

(58) Field of Classification Search ........... 455/452, 455/562, 450, 561, 38.3, 277.1; 370/335, 370/342, 390, 219, 221, 400
See application file for complete search history.

(56) References Cited

U.S. PATENT DOCUMENTS 5,584,049 A * 12/1996 Weaver et al. ......... 455/67.11
5,999,816 A * 12/1999 Tiedemann et al. ......... 455/437
6,381,462 B1 * 4/2002 Charas ................. 455/452.2
6,414,955 B1 * 7/2002 Clare et al. ............... 370/390
6,512,480 B1 * 1/2003 Reudink ................... 342/361
6,785,249 B2 * 8/2004 Soliman .................. 370/335
6,820,210 B1 * 11/2004 Daruwalla et al. ........... 714/4
2002/0062388 A1   5/2002 Ogier ....................... 709/238
2002/0176396 A1  11/2002 Hammel et al.
2004/0042427 A1 * 3/2004 Hottinen ................... 370/335

FOREIGN PATENT DOCUMENTS

EP   0999717   12/1998

OTHER PUBLICATIONS

Apostolopoulos, G.; Williams, D.; Kamat, S.; Guerin, R.; Orda, A.; Przygienda, T.; QoS Routing Mechanisms and OSPF Extensions; Networking Group, Request for Comments: 2676; Category: Experimental; Aug. 1999, pp. 1-50.

* cited by examiner

*Primary Examiner*—Erika A. Gary
*Assistant Examiner*—Julioz Perez (57) ABSTRACT

A wireless network has nodes, which can be accessed by wireless terminals via wireless access links, coupled via wireless transit links using multiple directional antenna beams. The nodes are self-organizing and self-adapting as nodes are added and as other changes occur. A new node uses beam scanning to listen for signals from any existing nodes and responds accordingly to join a network. Established nodes each recurrently transmit a welcome message on unused beams, to be received by a new node. Failure of transit links, e.g. due to interference on a channel frequency, is detected with automatic restoration using another frequency. Beam scanning can be enhanced using alternate overlapping beams and diversity techniques.

22 Claims, 5 Drawing Sheets

DISTRIBUTED MULTI-BEAM WIRELESS SYSTEM

This application claims the benefit of U.S. Provisional Application Ser. No. 60/446,619 filed Feb. 12, 2003 and U.S. Provisional Application Ser. No. 60/454,715 filed Mar. 15, 2003, the entire contents and disclosure of each of which are hereby incorporated herein by reference.

CROSS-REFERENCE TO RELATED APPLICATIONS

This patent application is related to the following Provisional patent applications filed in the U.S. Patent and Trademark Office, the disclosures of which are expressly incorporated herein by reference:

U.S. patent application Ser. No. 60/446,617 filed on Feb. 11, 2003 and entitled "System for Coordination of Multi Beam Transit Radio Links for a Distributed Wireless Access System" [15741]

U.S. patent application Ser. No. 60/446,618 filed on Feb. 11, 2003 and entitled "Rendezvous Coordination of Beamed Transit Radio Links for a Distributed Multi-Hop Wireless Access System" [15743]

U.S. patent application Ser. No. 60/446,619 filed on Feb. 12, 2003 and entitled "Distributed Multi-Beam Wireless System Capable of Node Discovery, Rediscovery and Interference Mitigation" [15742]

U.S. patent application Ser. No. 60/447,527 filed on Feb. 14, 2003 and entitled "Cylindrical Multibeam Planar Antenna Structure and Method of Fabrication" [15907]

U.S. patent application Ser. No. 60/447,643 filed on Feb. 14, 2003 and entitled "An Omni-Directional Antenna" [15908]

U.S. patent application Ser. No. 60/447,644 filed on Feb. 14, 2003 and entitled "Antenna Diversity" [15913]

U.S. patent application Ser. No. 60/447,645 filed on Feb. 14, 2003 and entitled "Wireless Antennas, Networks, Methods, Software, and Services" [15912]

U.S. patent application Ser. No. 60/447,646 filed on Feb. 14, 2003 and entitled "Wireless Communication" [15897]

U.S. patent application Ser. No. 60/451,897 filed on Mar. 4, 2003 and entitled "Offsetting Patch Antennas on an Omni-Directional Multi-Facetted Array to allow Space for an Interconnection Board" [15958]

U.S. patent application Ser. No. 60/453,011 filed on Mar. 7, 2003 and entitled "Method to Enhance Link Range in a Distributed Multi-hop Wireless Network using Self-Configurable Antenna" [15946]

U.S. patent application Ser. No. 60/453,840 filed on Mar. 11, 2003 and entitled "Operation and Control of a High Gain Phased Array Antenna in a Distributed Wireless Network" [15950]

U.S. patent application Ser. No. 60/454,715 filed on Mar. 15, 2003 and entitled "Directive Antenna System in a Distributed Wireless Network" [15952]

U.S. patent application Ser. No. 60/461,344 filed on Apr. 9, 2003 and entitled "Method of Assessing Indoor-Outdoor Location of Wireless Access Node" [15953]

U.S. patent application Ser. No. 60/461,579 filed on Apr. 9, 2003 and entitled "Minimisation of Radio Resource Usage in Multi-Hop Networks with Multiple Routings" [15930]

U.S. patent application Ser. No. 60/464,844 filed on Apr. 23, 2003 and entitled "Improving IP QoS though Host-Based Constrained Routing in Mobile Environments" [15807]

U.S. patent application Ser. No. 60/467,432 filed on May 2, 2003 and entitled "A Method for Path Discovery and Selection in Ad Hoc Wireless Networks" [15951]

U.S. patent application Ser. No. 60/468,456 filed on May 7,2003 and entitled "A Method for the Self-Selection of Radio Frequency Channels to Reduce Co-Channel and Adjacent Channel Interference in a Wireless Distributed Network" [16101]

U.S. patent application Ser. No. 60/480,599 filed on Jun. 20, 2003 and entitled "Channel Selection" [16146]

This invention relates to a wireless system, or communications network, which can comprise a plurality of distributed nodes among which wireless communications can take place via multiple beams or directive wireless communication paths.

BACKGROUND

To facilitate communications in a wireless system or communications network, it is desirable to provide a plurality of wireless access and routing points (WARPs) or nodes among which communications can take place via wireless links, the nodes optionally communicating via one or more wired connection paths with a communications network, with wireless terminals communicating with the nodes also via wireless links. For clarity herein, the wireless links via which the wireless terminals communicate with the nodes are referred to as access links, and the wireless links for communications among the nodes are referred to as transit links.

In such a wireless system, for example, the nodes can be distributed within a geographical region or area within which wireless access services are to be provided, and the wireless terminals can communicate among themselves and/or with the network via the various nodes. The wireless terminals can have any of various forms, and the communicated signals can comprise any desired form of information. Such a wireless system conveniently operates in a packet communications mode, in which for example a node is only active (transmitting or receiving radio signals) when it is sending or receiving data packets, and is otherwise in a quiescent or quiet state in which it only listens for traffic and occasionally exchanges signalling messages for administration of the wireless system.

By way of example, the wireless communications via the access and transit links can be in accordance with known standards, such as the IEEE 802.11 standard for wireless LAN (local area network) communications. Conveniently channels in different frequency bands are used for the access and transit links; for example channels in the 2.4 GHz band (IEEE 802.11b) for the access links and channels in the 5.2 and 5.7 GHz bands (IEEE 802.11a) for the transit links. However, this need not be the case and the access and transit links can use other frequency bands and/or can both use the same frequency band.

Such a system desirably provides multiple beams using directional antennas, i.e. directive wireless communication paths, for at least some of the transit links between pairs of nodes, thereby facilitating re-use of channel frequencies on the transit links. In particular, directional antenna beams can provide increased gain, and hence greater range, and directional azimuth beam patterning, which attenuates unwanted co-channel and adjacent channel interference, for example arising from simultaneous transmissions over a plurality of transit links. Each node can provide any desired number and configuration of directional antenna beams and the individual beams of each node can be similar to or different from one another. Conveniently, all of the nodes are similar to one another and all of the beams of each node are similar to one another; for example each node may provide 3, 6, 8, or more similar beams, but any other (smaller or larger) number of beams may be provided.

A known way of designing such a wireless system uses laborious centralized planning to address issues such as frequency re-use, scalability (expansion or contraction) of the system over time, and adaptability to changes. With a rigid frequency re-use plan, the system must be redesigned when the interference environment changes; this is a particular problem for a system operating in an unlicensed frequency band, and is costly in terms of both labour and system capacity. If the system needs to be expanded or modified, for example to provide additional nodes, a system with centralized planning again requires massive redesign.

It would be desirable to provide an improved wireless system which is self-organizing or self-adapting as nodes are added and/or removed and/or in dependence upon changes in the environment of the system.

SUMMARY OF THE INVENTION

According to this invention there is provided a method of detecting nodes for wireless communications between nodes forming a wireless network, comprising the steps of: recurrently sending from a node forming a part of the wireless network a message for detection by any new node; and in a new node, monitoring for detection of said message and/or for wireless network traffic, responding to such detection, and in the absence of such detection recurrently sending a message for detection by any other node.

Preferably the nodes comprise multiple beam directional antennas. In this case, the step of recurrently sending from a node forming a part of the wireless network a message for detection by any new node preferably comprises recurrently sending said message on antenna beams not carrying wireless network traffic, the step of recurrently sending a message for detection by any other node from a new node in the absence of said detection preferably comprises recurrently sending said message on each of a plurality of antenna beams, and the step of, in a new node, monitoring for detection of said message and/or for wireless network traffic preferably comprises successively monitoring using each of a plurality of antenna beams, advantageously using a subset of overlapping antenna beams of the node.

Preferably the nodes comprise main and diversity receive paths, in which case the step of successively monitoring using each of a plurality of antenna beams can comprise monitoring using the main and diversity receive paths simultaneously for antenna beams having different directions. The main and diversity receive paths can be provided using, for example, space diversity or polarization diversity, providing a significant gain in performance and link budget. Using antenna beams with orthogonal polarization (e.g. vertical and horizontal polariztion, or +/- 45 degree or any other desired orthogonal angles) may be preferred to facilitate providing a more compact antenna structure.

The wireless communications preferably comprise a plurality of frequency channels, and the step of, in a new node, monitoring for detection of said message and/or for wireless network traffic preferably comprises successively monitoring for each of a plurality of the frequency channels, desirably all of the frequency channels. The step of recurrently sending a message for detection by any other node from a new node in the absence of said detection can comprise recurrently sending said message using each of a plurality of the frequency channels, desirably all of the frequency channels.

The method preferably further comprises the step of, in each node which communicates with another node of the wireless network using a given frequency, compiling a list of preferred frequencies for potential use for such communications in the event of failure of such communications using the given frequency. This method can further comprise the steps of, in a node which communicates with another node using a given frequency, detecting failure of such communications using the given frequency, sending an indication of a preferred frequency from its list via other communications paths (which may be wired or wireless) of the network, and sending to said another node a message to use the preferred frequency for restoring the failed communications.

Another aspect of the invention provides a node for a wireless access network, the node comprising an access radio system for bidirectional wireless communications with wireless terminals, a transit radio system for bidirectional wireless communications with at least one other node of the network, and a communications control unit for coupling signals to be communicated between the access radio system and the transit radio system, the control unit being arranged for operation of the node in accordance with the above method.

In such a node the transit radio system preferably comprises a multiple beam directional antenna, and preferably the transit radio system and its antenna comprise main and diversity receive paths.

Another aspect of the invention provides a wireless access network comprising a plurality of nodes each as recited above; such a network commonly may include a connection of one of the nodes to a communications network.

BRIEF DESCRIPTION OF THE DRAWINGS

The invention will be further understood from the following description by way of example with reference to the accompanying drawings, in which.

DETAILED DESCRIPTION

Figure 1:
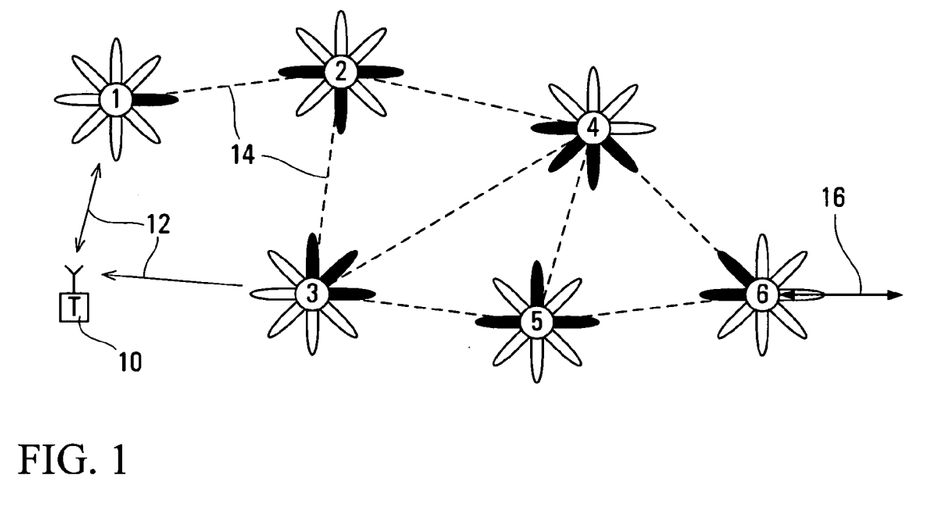
FIG. 1 diagrammatically illustrates a distributed wireless access system to which embodiments of the invention can be applied.

FIG. 1 illustrates a distributed wireless access network or system which serves to enable subscribers with suitable terminals, which may have any of various forms and one of which is represented by a wireless terminal 10, to access the network and to receive various services. The system comprises wireless access and routing points (WARPs) or nodes which are distributed over a geographic region or service area; by way of example in FIG. 1 six nodes referenced 1 to 6 are represented diagrammatically as further described below.

The terminal 10 communicates signals to the nearest node via a radio link, referred to herein as an access link, illustrated by arrows 12 in FIG. 1. Signal traffic is communicated between pairs of the nodes via further radio links, referred to herein as transit links and illustrated in FIG. 1 by dashed lines 14 between pairs of the nodes 1 to 6. Via these links, signals are communicated between the terminal 10 and another terminal (not shown) in the same local area network (LAN) and/or a communications network such as is represented in FIG. 1 by a line 16 coupled to the node 6. The system may also provide for communication with, and among, dedicated transit nodes.

In order to facilitate communications and re-use of channel frequencies on the transit links, the nodes 1 to 6 use directional antenna beams for communications between pairs of nodes. For simplicity and by way of example as described herein, each node is assumed to provide 8 beams, as represented diagrammatically in FIG. 1 by a symmetrical arrangement of 8 lobes extending from a central circle representing each of the nodes 1 to 6, and the nodes are assumed all to be similar. The lobes or directional antenna beams used by each node for the respective transit links are shown as solid to represent this use. It can be appreciated that each node can provide any desired number of antenna beams, and that these can be arranged to provide any desired beam pattern or configuration.

Figure 2:
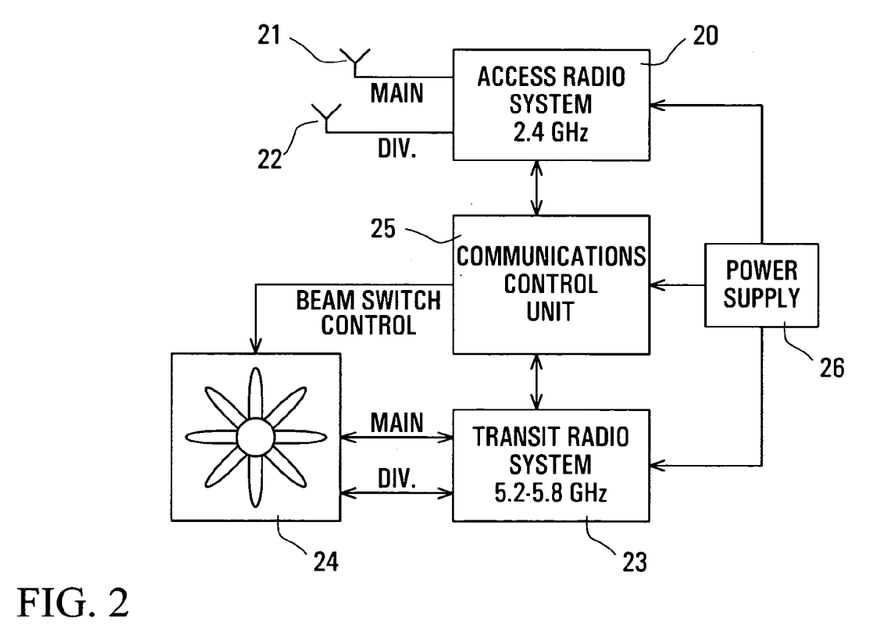
FIG. 2 schematically illustrates a node of the system of FIG. 1 in accordance with an embodiment of the invention.

FIG. 2 schematically illustrates a node of the system of FIG. 1 in accordance with an embodiment of the invention. In this embodiment, the node comprises an access radio system 20 having main and diversity (DIV.) path antennas 21 and 22, a transit radio system 23 which provides main and diversity path signals to and from a directional antenna 24, a communications control unit 25 which provides a beam switch control signal to the antenna 24 and provides for communications of signals between the radio systems 20 and 23, and a power supply 26 which provides power to the units 20, 23, and 25 from a power source (not shown) such as a battery or ac supply.

In this embodiment of the invention the access radio system 20 is a bidirectional radio system operating in accordance with IEEE Standard 802.11b in channels in the 2.4 GHz frequency band, and the transit radio system is a bidirectional radio system operating in accordance with IEEE Standard 802.11a in channels in the 5.2 and 5.7 GHz frequency bands. The different frequency bands avoid interference between the two radio systems, but in other embodiments of the invention both radio systems can use the same frequency band, and/or other sets of frequencies can be used. Such radio systems are widely available and need not be further described here.

The control unit 25 serves to couple signal packets from/to the access radio system 20 to/from the transit radio system 23, with buffering or storage in memory in the unit 25 as may be necessary, for communications via the respective antenna beam. Although not shown separately in FIG. 2, the antenna 24 provides space or polarization diversity for each directional antenna beam. As one example, the antenna 24 may provide polarization diversity using vertical polarization for the main signal path and horizontal polarization for the diversity signal path. As another example, the antenna 24 may use +/− 45 degree (or other orthogonal angles) to provide polarization diversity, e.g. using compact dual feed patch antenna elements.

The same directional antenna beams can be used for both transmitting and receiving signals via the antenna 24. As an alternative in some embodiments of the invention as described below, the antenna 24 can include a separate antenna component, for example an omnidirectional antenna, for receiving transit radio signals in a similar manner. Alternatively, with a more complex switching and/or combining arrangement, an omnidirectional antenna function can be provided more compactly by combining signals of a plurality of directional antenna beams.

It is desirable for a wireless system as described above with reference to FIGS. 1 and 2 to be self organizing and self adapting, so that it can set itself up initially and adjust itself to changing environments such as interference, to the addition, removal, or modification (e.g. re-positioning) of nodes, and to other changes which may take place, without requiring substantial initial planning and subsequent redesign to accommodate such changes. These advantages are provided in a wireless system in accordance with embodiments of the invention as further described below.

More particularly, in a wireless system in accordance with an embodiment of the invention each node has a plurality of operating modes, which may include what are referred to herein as self-discovery receive and transmit modes, a rediscovery mode, and a beam scanning mode of operation.

Without conventional centralized planning and set-up, on initial deployment and powering of a node it (i.e. its control unit 25) has no information as to whether it is being provided in an existing network with other nodes already in operation, or whether it is the first node of a new system. In order to determine information in this respect, it enters a self-discovery receive mode which is described below with reference to FIGS. 3 to 5. In this case it is initially assumed that the node uses an omnidirectional receive antenna as discussed above.

Figure 3:
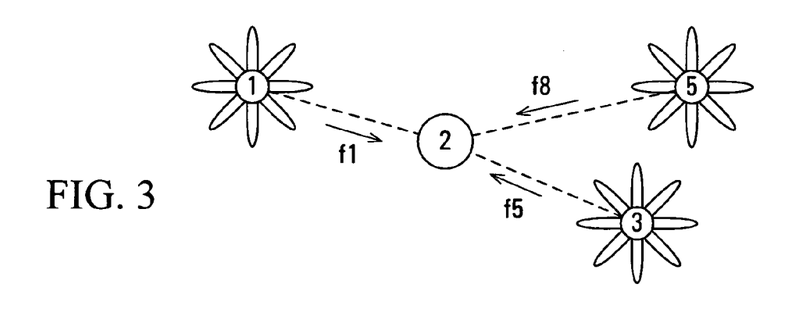
FIG. 3 illustrates a self-discovery receive mode of operation.
Figure 4:
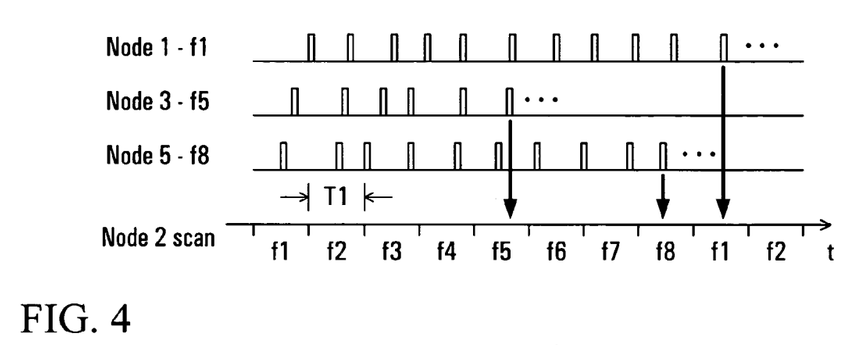
FIG. 4 shows a related time diagram.

FIG. 3 illustrates Node 2 in the self-discovery receive mode, with Nodes 1, 3, and 5 already in operation. As described further below, each node in operation in the network transmits with relatively random timing, at least once every period T1, i.e. recurrently, a welcome message to be heard by any new nodes. FIG. 4 is a time diagram illustrating these messages, which are transmitted by the Nodes 1, 3, and 5 in this example on channels at frequencies f1, f5, and f8 respectively for beams directed from these nodes towards the new Node 2. As also shown in FIG. 4, the new Node 2 scans each of the channel frequencies, here represented as frequencies f1 to f8, in turn each for a period T1, thereby to detect the welcome messages of the operating nodes at their respective channel frequencies over time t. Although 8 frequencies f1 to f8 are referred to here by way of example, there may be any desired number of channel frequencies.

Figure 5:
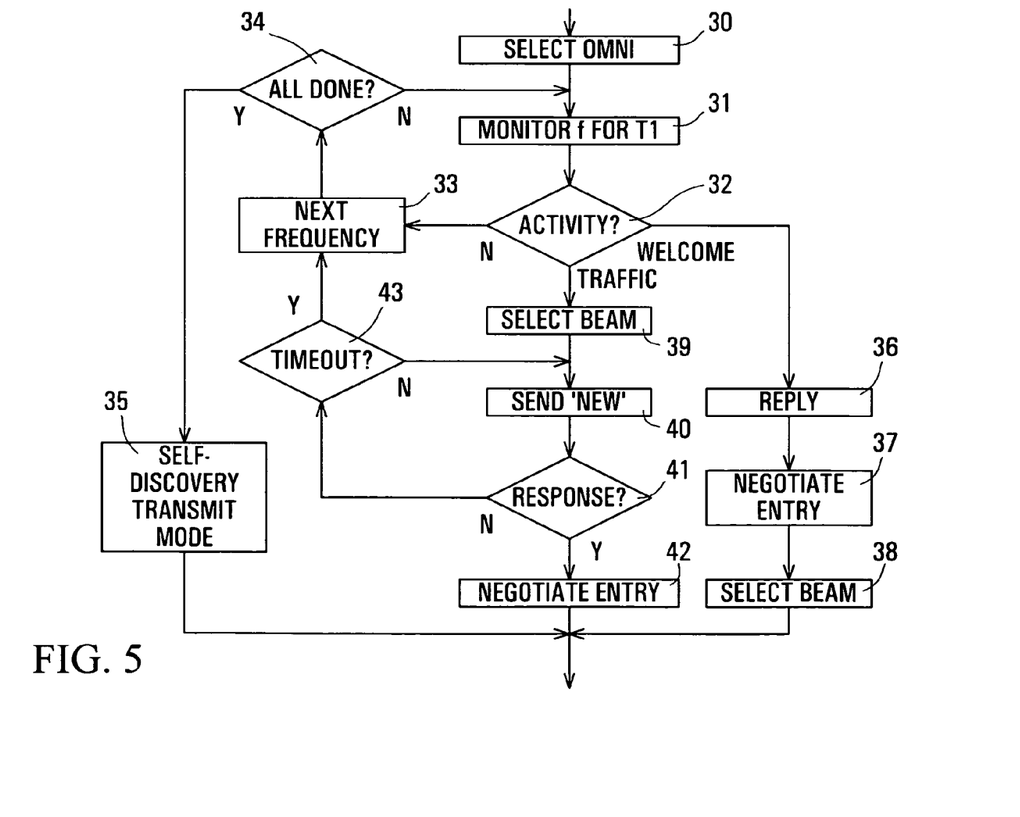
FIG. 5 shows a corresponding flow chart for a node in accordance with an embodiment of the invention.

This process is represented by the flow chart in FIG. 5, with reference numerals for the flow chart steps shown in FIG. 5 given in parentheses in the following description.

Referring to FIG. 5, Node 2 selects (30) its omnidirectional receive antenna, and then monitors (31) a channel at frequency f for the period T1 to determine any signal activity (32) on this channel. If it does not detect any signals on the monitored channel, it proceeds to the next channel frequency (33) and continues in a monitoring loop until all of the channel frequencies (34) have been monitored and there is a timeout without any activity having been detected. In that case Node 2 would conclude that it is the first node in a new system, and proceeds to the self-discovery transmit mode (35), described below.

In the example of FIG. 3, Node 2 would detect activity at the frequencies f1, f5, and f8, and in each case this activity can comprise a welcome message as described above or signal traffic. In the former case Node 2 sends a reply (36) to the received welcome message (for example this can be sent omnidirectionally, or on each directional beam of Node 2 in turn), and this leads to communication with the node which sent the welcome message to negotiate entry (37) of Node 2 onto the network and to select (38) the beam to be used by Node 2 for each transit link to another node of the network. These steps are carried out in any desired manner and can include transfer to Node 2 of information about the network known by the already operating nodes.

If Node 2 hears signal traffic but not a welcome message, then it selects (39) a beam and frequency for which the traffic has the strongest signal strength, waits for a pause in this traffic, and sends (40) a 'new' message to indicate its presence. It then awaits a response (41), and on receiving such a response negotiates entry (42) onto the network as indicated above. If there is no response within a timeout period (43), Node 2 continues with the next frequency (33) as discussed above.

Figure 6:
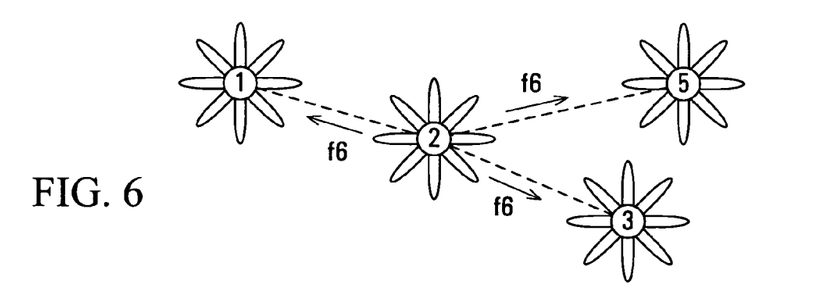
FIG. 6 illustrates a self-discovery transmit mode of operation.
Figure 7:
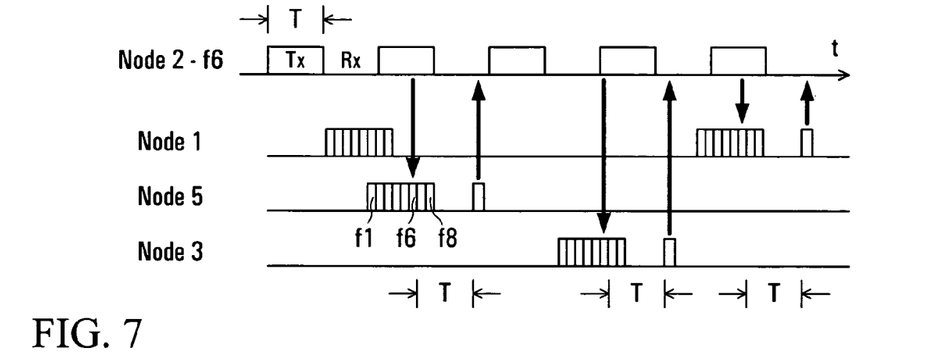
FIG. 7 shows a related time diagram.

FIG. 6 illustrates Node 2 in the self-discovery transmit mode, and also shows Nodes 1, 3, and 5 which are assumed to be added after Node 2. FIG. 7 is a corresponding time diagram representing node operation in the self-discovery transmit mode, in conjunction with the steps of the flow chart of FIG. 8.

Figure 8:
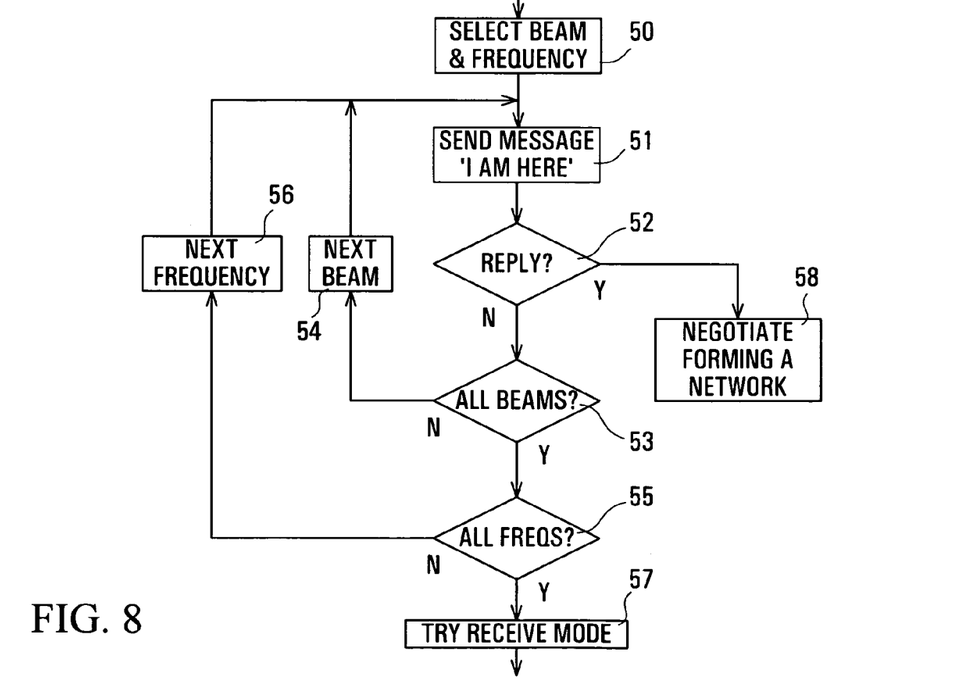
FIG. 8 shows a corresponding flow chart for a node in accordance with an embodiment of the invention.

In this mode, as shown in FIG. 8 Node 2 selects (50) a transmit antenna beam and a frequency, and on this beam and at this frequency alternately, in each case for a period T as shown at the top of FIG. 7, transmits (51) a message 'I am here' and checks (52) for a reply. In the absence of a reply, Node 2 checks (53) whether the message has been sent on all beams at this frequency, if not selecting the next beam (54) to continue in a first loop, and if so checks (55) whether all frequencies have been tried, if not selecting the next frequency (56) and continuing in a second loop and if so again trying the receive mode (57) as described above. In the event that Node 2 receives a reply, Node 2 communicates (58) with the replying node to negotiate forming a network.

FIG. 6 illustrates Node 2 sending the message 'I am here' at the frequency f6 on respective beams to Nodes 1, 3, and 5. The top part of FIG. 7 indicates this frequency f6 and shows the alternating transmission (Tx) and reception (Rx) by Node 2 in each case for the period T. The rest of FIG. 7 illustrates listening and transmitting (reply) periods for Nodes 1, 3, and 5. For each of the listening periods, the respective node listens at the frequencies f1 to f8 in turn, as these nodes at this time are in the self-discover receive mode as described above. For Node 5, the listening times for the frequencies f1, f6, and f8 are indicated in FIG. 7.

As shown in FIG. 7, the monitoring or listening time for the frequency f6 for Node 1 initially corresponds to a receiving time of Node 2, so a message from Node 2 is not detected. Subsequently, Node 5 monitors the frequency f6 when Node 2 is transmitting, detects the message from Node 2 as shown by a bold down arrow, and after a delay T transmits a reply. The delay T ensures that Node 2 is in its receiving mode when Node 5 transmits its reply, as shown by a bold up arrow. Similarly, FIG. 7 shows detection of and replies to the message from Node 2 at later times by Nodes 3 and 1.

The nodes of the network have an implicit hierarchy, with the two nodes associated with each transit link acting in a master and slave relationship in accordance with this hierarchy. The hierarchy can be arranged and developed in any of a variety of ways. By way of example, nodes closer to a main communications network access point (for example, the line 16 in FIG. 1) can be considered to be higher in the hierarchy than those further from this line. In the absence of such an access point, i.e. in the case of an isolated LAN, nodes with the greatest transit link connectivity can be considered highest in the hierarchy. Linked nodes with the same level in the hierarchy can be designated as master and slave for the respective link in accordance with random choice or in any other desired manner.

If communication via a transit link becomes unreliable, for example due to interference, the master node for this link can initiate a rediscovery mode if it is also connected via at least one other transit link. The rediscovery mode process is enhanced by using the network to inform the slave node of frequencies and antenna beams to be tried, as further described below. A node having only one transit link goes into the self-discovery receive mode as described above if its sole transit link is lost.

Figure 9:
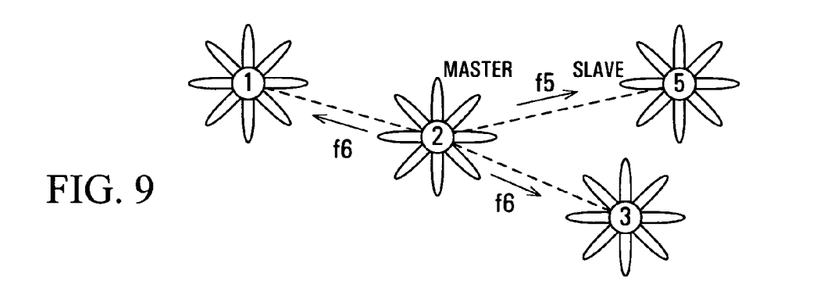
FIG. 9 illustrates a rediscovery mode of operation.

FIG. 9 illustrates Nodes 1, 2, 3 and 5 with Nodes 2 and 5 in the rediscovery mode. It is assumed that the transit link between Nodes 2 and 5, assigned as master and slave nodes respectively for this transit link, for example using frequency f2, has become blocked due to interference. In normal operation, during relatively idle times each node compiles a list of preferred frequencies for use, for which the node (i.e. signal detectors in the node) detects a least signal level corresponding to least interference. For example, FIG. 9 shows Node 2 in rediscovery mode transmitting on channel frequency f5 as a preferred frequency, for communications with Node 5, from the compiled list of Node 2.

Figure 10:
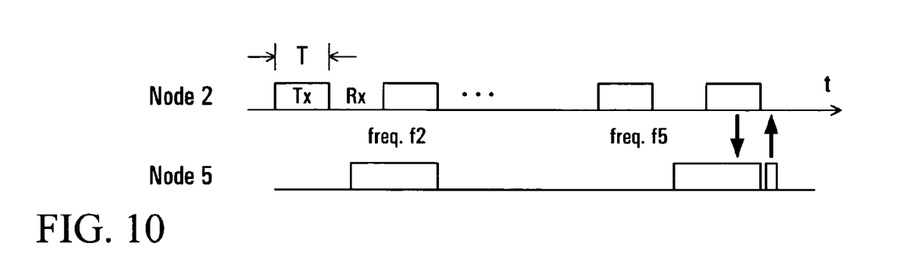
FIG. 10 shows a related time diagram.
Figure 11:
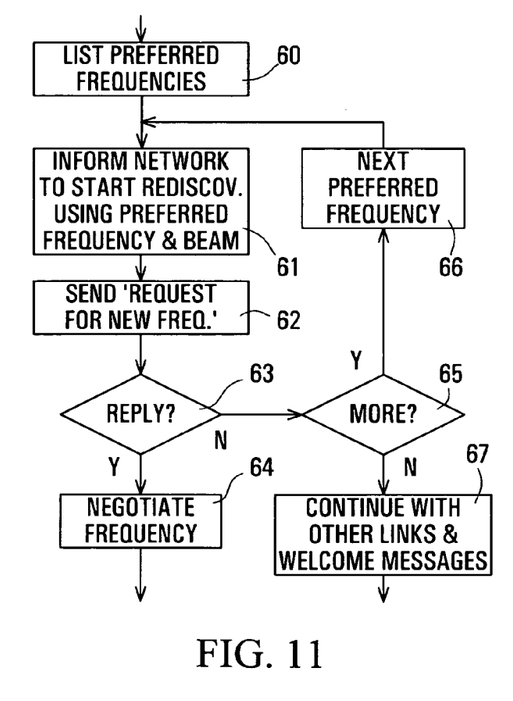
FIGS. 11 and 12 show corresponding flow charts, respectively for master and slave nodes, in accordance with an embodiment of the invention.
Figure 12:
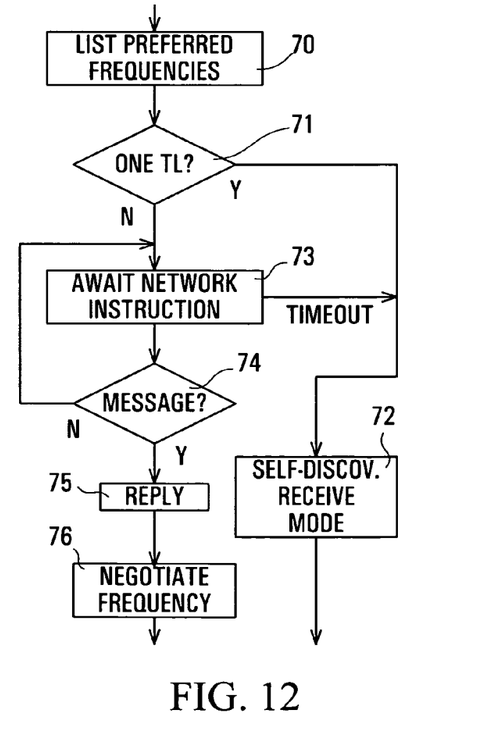

FIG. 10 is a time diagram representing this operation of the master and slave Nodes 2 and 5 in the rediscovery mode, and FIGS. 11 and 12 are flow charts showing corresponding steps for the master and slave nodes, respectively, in the rediscovery mode, showing the compiling of a list of preferred frequencies as steps 60 and 70 respectively.

Node 2, being the master for the transit link between Nodes 2 and 5, determines that the transit link (at frequency f2) has ceased to be operational, as shown at the left of FIG. 10. Node 2 informs Node 5 (61, FIG. 11) via the network (i.e. via its other operational transit links or any other available wired or wireless communications paths—the network can alternatively initiate this process) to go into the rediscovery mode using the appropriate beam and the first preferred frequency of Node 2 (f5 in this example), and then transmits on its preferred frequency f5 a 'Request for new frequency' message (62), with alternating periods each of duration T for transmission and listening (63) for a reply, as illustrated at the right of FIG. 10. In the event of a reply as described further below, Node 2 negotiates (64) via the restored communications with Node 5 for a new frequency for continued communication between the nodes. If Node 2 does not receive a reply, then within a time-out period and while there are more preferred frequencies to be tried (65) it proceeds to the next preferred frequency (66) and continues in a loop, and otherwise continues (67) with traffic on other transit links and with the treansmission of welcome messages as described above.

Node 5, on determining that its transit-link with Node 2 for which it is the slave is not operational, determines (71, FIG. 12) whether this is its only transit link (TL) and if so goes into the self-discovery receive mode (72) as described above. If it has at least one other transit link, it awaits (73) receipt of the instruction via the network (i.e. via its other transit link(s)), and goes to the self-discovery receive mode (72) if such instruction is not received within a timeout period. On receipt of the instruction via the network, Node 5 selects the appropriate beam and listens (74), using the frequency (here f5) indicated by the instruction, for the 'Request for new frequency' message from Node 2. On receipt of this message as shown by a bold down arrow in FIG. 10, Node 5 replies (75) with an acknowledgement (after a delay for Node 2 to return to listening mode) as shown by a bold up arrow in FIG. 10, and proceeds to negotiate (76) a new frequency for continuing communications with Node 5. This frequency negotiation can be based on the preferred frequencies in the compiled lists in both of Nodes 2 and 5.

It can be appreciated from the above description that the rediscovery mode differs from the self-discovery modes in that the two nodes already each know a preferred antenna beam for the transit link, this being stored in and recalled from memory in each node. As failure of a transit link with an existing node will typically be due to radio interference on the channel that has been used for the link, selecting another frequency channel with the same antenna beam will probably restore the transit link. If a transit link fails due to other changes such as an obstruction introduced into the link path or a change in location or alignment of a node, then there is an appropriate reversion to the self-discovery processes described above.

As described above with reference to FIGS. 3 to 5, the self-discovery receive mode uses an omnidirectional antenna to receive signals from any direction, and frequency scanning to cover all of the frequency channels. Conveniently, the directional antenna beams can be used instead to receive signals, desirably with one receiver which is switched in turn to each antenna beam by the beam switch control of the control unit 25, to provide a beam scanning function. Alternatively, more than one receiver can be used in a similar manner, up to one receiver for each antenna beam, thereby reducing switching losses and scanning delays. One or more wide-band, or multi-channel, receivers can similarly be used to receive a larger part or all of the frequency spectrum, with down-conversion of the RF signal and digital signal processing to distinguish the different channels. In any event, in each node resulting information can be derived, stored, and updated for parameters such as frequencies, beams, signal strengths, and signal to interference ratios to be used in the network for interference mitigation and signal (e.g. data packet) routing.

For example using beam and frequency scanning with a single transit link receiver, on power-up this can operate in a self-discovery receive mode as described above with reference to FIGS. 3 to 5, with the addition that the antenna beams are scanned (the receiver is connected to each directional antenna in turn) as well as the frequencies, for example in a similar manner to that shown by the loops in the flow chart of FIG. 8. In this case on detection of communications using any beam, the node can stop scanning, transmit on that beam, and listen for an acknowledgement from the network, in response to which it negotiates to join the network. In this case the negotiation can include testing of adjacent beams to ensure that an optimum beam for the communication is selected. In addition, an already-connected node can communicate to the new node, during this negotiation, information about other nodes, beams, frequencies, etc., which the new node can use to facilitate finding multiple connections to the network.

If the newly powered up node does not detect any traffic during the beam and frequency scanning, it goes into a self-discovery transmit mode similar to that described above.

It can be appreciated that the directional antenna beam scanning provides greater antenna gain, and hence sensitivity to existing communications, than an omnidirectional antenna arrangement as discussed above. However, it also increases the time required for scanning all of the beams and frequencies while still providing a minimum dwell time for each beam at each frequency. Improvements in the effective scanning speed are described later below.

A node that is already connected in the network already transmits signals on the beam(s) that it uses for transit link communications, and listens for signals on these beams at respective frequencies, as further described below; during these transmit/receive periods it can be heard by or can receive signals from a new node via these antenna beams. Each such connected node also transmits a 'welcome' message or packet on each of its unused antenna beams at least once in a given period, and listens for any signal from a new node on each of its unused antenna beams at least once in a given period, i.e. recurrently. This ensures that any new node is detected in a similar manner to that described above.

As described above, communications via the transit links conveniently convey traffic in data packets; in the absence of traffic to be carried via the transit link between two nodes, the nodes do not transmit but are relatively quiet or quiescent. In order to prepare the quiescent nodes for data packet transmission, a node having traffic to send transmits on the antenna beam to the relevant destination node a small ARTS (Application Request To Send) packet, and waits for an acknowledgement (ACK). Each quiescent node is in what is referred to as a neighbourhood listening mode, in which it listens for ARTS packets and acknowledges them when they are received. An ARTS packet is like a conventional RTS (Request To Send) message, but is effective at the higher Application Layer.

Figure 13:
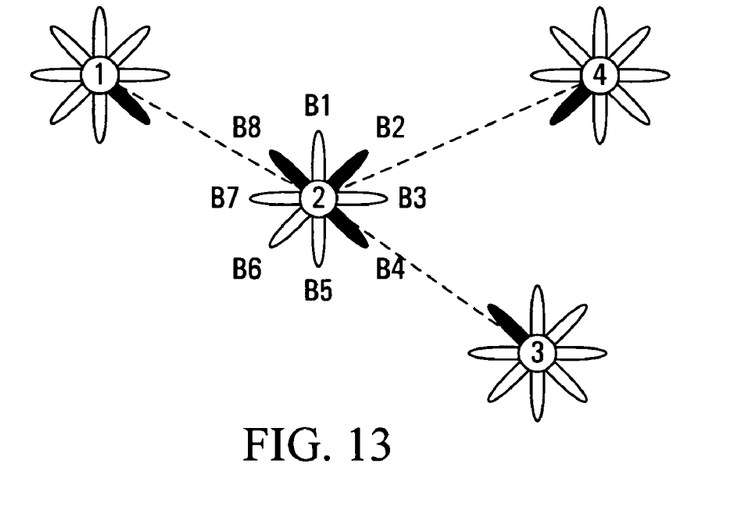
FIG. 13 diagrammatically illustrates a beam scanning mode of operation for a node in accordance with another embodiment of the invention.

FIG. 13 illustrates Nodes 1 to 4, with Node 2 having three neighbours constituted by the Nodes 1, 3, and 4 with which it communicates via antenna beams shown solid in FIG. 13. Thus Node 2 uses beams identified as B8, B4, and B2 when it communicates with Nodes 1, 3 and 4 respectively, and is not currently using the other antenna beams identified as B1, B3, and B5 to B7.

In its neighbourhood listening mode, the control unit 25 of Node 2 selects each of the beams B2, B4, and B8 in turn, and Node 2 listens for a predetermined time for any ARTS packet or for a received signal strength indication (RSSI) above a threshold, and continues this beam scanning until it detects an ARTS packet or RSSI above the threshold, or until the control unit determines another mode of operation. It can be appreciated that Node 2 stores information about the relevant beams, frequencies, signal polarizations, and addresses of the neighbouring nodes 1, 3, and 4 which has been determined during previous communications in the network. In response to a received ARTS packet, Node 2 replies with an ACK on the relevant antenna beam, so that the node sending the ARTS packet is informed to send the traffic.

Conversely, a node having traffic to send initially sends on the antenna beam to the relevant destination node an ARTS packet, or preferably a stream of ARTS packets to increase the probability of the destination node beam scanning being aligned to the relevant antenna beam. Node 2 physical layer replies with the ACK on the antenna beam to the node with traffic to send, and a transit link control layer of Node 2 sends an ACTS (Application Clear To Send) packet to the node with traffic to send. Consequently the antenna beams are aligned in the two nodes and the traffic data packets are sent to the destination Node 2.

It can be appreciated that during the beam scanning operations as described above the dwell time during which the receiver is switched to a respective beam must be sufficiently long for an RSSI measurement to be made and reported. In order to increase an effective rate of beam scanning without reducing the dwell time, various techniques can be used, individually or in various combinations, as described below.

Figure 14:
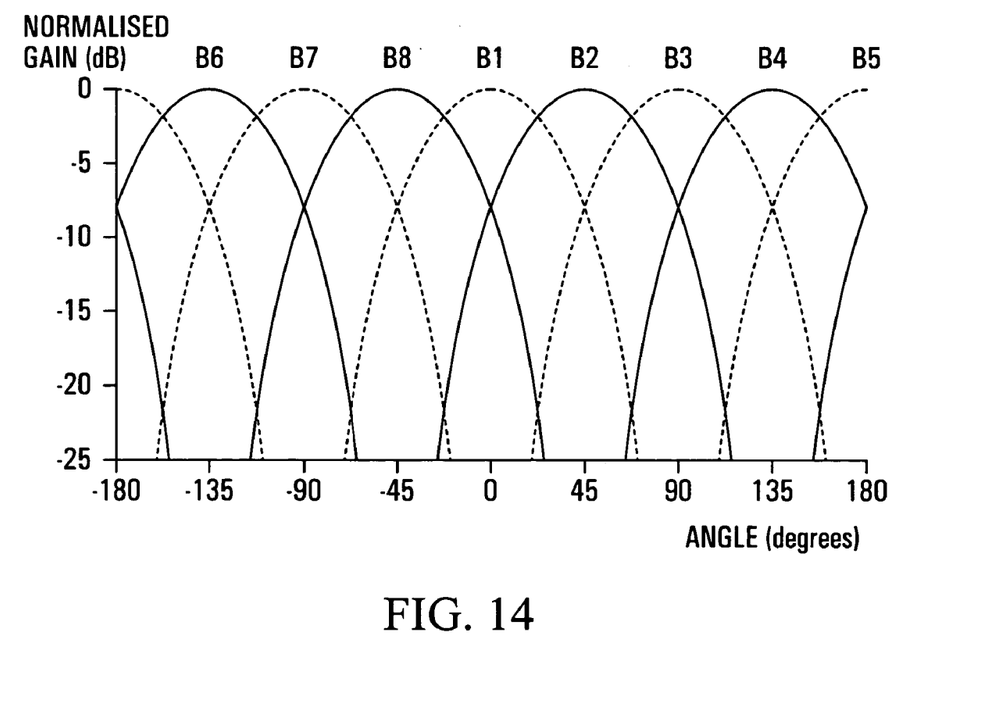
FIG. 14 is a graph illustrating overlap of antenna beams of a node.

With for example 8 antenna beams as described above, the beams are conveniently oriented every 45 degrees and there may be considerable beam overlap, for example as shown in FIG. 14 which illustrates normalised gain for the eight beams B1 to B8 as a function of angle, relative to zero degrees which is assumed to be the orientation of the center of beam B1. Gain curves for the alternate beams B1, B3, B5, and B7 are shown by dashed lines, and it can be seen that the other four beams alone provide a reasonable sensitivity for all orientation angles.

Accordingly, it can be appreciated that the beam scan period in, for example, the self-discovery mode can be halved by including only alternate ones of the beams in the scan, and relying on the beam overlap for signal detection. The beam scanning can alternatively be interleaved in alternate cycles, for example the beams being switched in a sequence such as B2, B4, B6, B8, B1, B3, B5, B7, B2, B4, etc. The transit link control can decode the node identity or address from the ARTS packet to enable it to select the optimum beam for each transit link.

It can be appreciated that a similar process can be used for any number of antenna beams.

As described above, the antenna 24 provides main and diversity paths, for example using vertical and horizontal polarization. The control unit 25 can be arranged to switch the diversity paths independently, so that for example the main signal receive path is switched to a vertically polarized antenna beam having one orientation or direction while the diversity signal receive path is switched to a horizontally polarized antenna beam having another, for example opposite, orientation or direction.

The two techniques above, of alternate interleaved beam scanning and polarization diversity beam scanning, can be combined. For example, denoting the main receive path by M, the diversity receive path by D, vertical polarization by V, horizontal polarization by H, and the beams by B1 to B8, the scanning sequence can for example be (M-B2-V, D-B4-H), (M-B6-V, D-B8-H), (M-B1-V, D-B3-H), (M-B5-V, D-B7-H), etc. It can be appreciated that although vertical and horizontal polarizations are referred to herein, any other orthogonal polarizations can be used.

As already described, the nodes have a hierarchy, and the transit links can similarly have a hierarchy, which may be dynamic (variable over time), and the beam scanning in the neighbourhood listening mode can be carried out in accordance with this hierarchy so that the nodes give the greatest resources (scanning time or rate) to the most important transit links or beams. For example, transit links that are close to the network connection (line 16 in FIG. 1) can be scanned with the greatest frequency to minimize delay. For example, if in FIG. 13 Node 2 determines that its transit link to Node 1 is the most important, then it could carry out its scanning with a weighted sequence such as B8, B2, B8, B4, B8, etc.

This weighted scanning can be combined with the polarization diversity beam scanning, for example with a sequence such as (M-B8-V, D-B2-H), (M-B8-V, D-B4-H), (M-B8-V, D-B2-H), etc., so that one beam and polarization permanently monitors the most important link of the node while the other polarization is used to scan the other beams in turn.

It can be appreciated from the above description that embodiments of the invention can facilitate the implementation, operation, and evolution of a wireless system or network in a very effective manner to provide desired communications services. For example, embodiments of the invention can be used to facilitate providing relatively high data rate wireless LAN communications services in selected areas having service demands that are high or subject to change, in a manner that is compatible with and easily upgradeable from known systems in accordance with standards such as IEEE Standards 802.11 and 802.16.

Although particular embodiments of the invention and variations are described above, it can be appreciated that these are given only by way of example and illustration, and that numerous modifications, variations, and adaptations may be made within the scope of the invention as defined in the claims.

The invention claimed is:

1. A method of detecting nodes for wireless communications between nodes forming a wireless network, comprising the steps of:
   recurrently sending from a node forming a part of the wireless network a message for detection by any new node; and
   in a new node, monitoring for detection of said message and for wireless network traffic, responding to detection of said message by sending a reply, responding to wireless network traffic by waiting for a pause in the wireless network traffic and sending a message during the pause to indicate the presence of the new node, arid otherwise recurrently sending a message for detection by any other node.

2. A method as claimed in claim 1 wherein the nodes comprise multiple beam directional antennas, and the step of recurrently sending from a node forming a part of the wireless network a message for detection by any new node comprises recurrently sending said message on antenna beams not carrying wireless network traffic.

3. A method as claimed in claim 1 wherein the nodes comprise multiple beam directional antennas, and the step of recurrently sending a message for detection by any other node from a new node comprises recurrently sending said message on each of a plurality of antenna beams.

4. A method as claimed in claim 1 wherein the nodes comprise multiple beam directional antennas, and the step of, in a new node, monitoring for detection of said message and for wireless network traffic comprises successively monitoring using each of a plurality of antenna beams.

5. A method as claimed in claim 4 wherein the step of successively monitoring using each of a plurality of antenna beams uses a subset of overlapping antenna beams of the node.

6. A method as claimed in claim 4 wherein the nodes comprise main and diversity receive paths, and the step of successively monitoring using each of a plurality of antenna beams comprises monitoring using the main and diversity receive paths simultaneously for antenna beams having different directions.

7. A method as claimed in claim 5 wherein the nodes comprise main and diversity receive paths, and the step of successively monitoring using each of a plurality of antenna beams comprises monitoring using the main and diversity receive paths simultaneously for antenna beams having different directions.

8. A method as claimed in claim 1 wherein the wireless communications comprise a plurality of frequency channels, and the step of, in a new node, monitoring for detection of said message and for wireless network traffic comprises successively monitoring for each of a plurality of the frequency channels.

9. A method as claimed in claim 1 wherein the wireless communications comprise a plurality of frequency channels, and the step of recurrently sending a message for detection by any other node from a new node comprises recurrently sending said message using each of a plurality of the frequency channels.

10. A method as claimed in claim 9 wherein the nodes comprise multiple beam directional antennas, and the step of recurrently sending a message for detection by any other node from a new node further comprises recurrently sending said message on each of a plurality of antenna beams.

11. A method as claimed in claim 10 wherein the step of, in a new node, monitoring for detection of said message and for wireless network traffic comprises successively monitoring using each of a plurality of antenna beams.

12. A method as claimed in claim 11 wherein the step of successively monitoring using each of a plurality of antenna beams uses a subset of overlapping antenna beams of the node.

13. A method as claimed in claim 11 wherein the nodes comprise main and diversity receive paths, and the step of successively monitoring using each of a plurality of antenna beams comprises monitoring using the main and diversity receive paths simultaneously for antenna beams having different directions.

14. A method as claimed in claim 1 wherein the wireless communications comprise a plurality of frequency channels, the method further comprising the step of, in each node which communicates with another node of the wireless network using a given frequency, compiling a list of preferred frequencies for potential use for communications with said another node of the wireless network in the event of failure of said communications using the given frequency.

15. A method as claimed in claim 14 and further comprising the steps of, in said node which communicates with another node using a given frequency, detecting failure of said communications using the given frequency, sending an indication of a preferred frequency from its list via other communications paths of the wireless network, and sending to said another node a message to use the preferred frequency for restoring the failed communications.

16. A node for a wireless access network, the node comprising an access radio system for bidirectional wireless communications with wireless terminals, a transit radio system for bidirectional wireless communications with at least one other node of the network, and a communications control unit for coupling signals to be communicated between the access radio system and the transit radio system, the control unit being arranged for operation of the node in accordance with the method of claim 1.

17. A node as claimed in claim 16 wherein the transit radio system comprises a multiple beam directional antenna.

18. A node as claimed in claim 17 wherein the transit radio system and its antenna comprise main and diversity receive paths.

19. A wireless access network comprising a plurality of nodes each as claimed in claim 17.

20. A wireless access network as claimed in claim 19 and including a connection of one of the nodes to a communications network.

21. A method of detecting nodes for wireless communications between nodes forming a wireless network, comprising the steps of:

recurrently sending from anode forming a part of the wireless network a message for detection by any new node; and in a new nod; monitoring for detection of said message and/or for wireless network traffic, responding to detection of said message and/or wireless network traffic and in the absence of detection of said message and/or wireless network traffic recurrently sending a message for detection by any other node;

wherein the wireless communications comprise a plurality of frequency channels, the method further comprising the step of, in each node which communicates with another node of the wireless network using a given frequency, compiling a list of preferred frequencies for potential use for communications with said another node of the wireless network in the event of failure of said communications using the given frequency.

22. A method as claimed in claim 21 and further comprising the steps of, in said node which communicates with another node using a given frequency, detecting failure of said communications using the given frequency, sending an indication of a preferred frequency from its list via other communications paths of the wireless network, and sending to said another node a message to use the preferred frequency for restoring the failed communications.

* * * * *

UNITED STATES PATENT AND TRADEMARK OFFICE
CERTIFICATE OF CORRECTION

PATENT NO. : 7,177,644 B2  Page 1 of 1
APPLICATION NO. : 10/682084
DATED : February 13, 2007
INVENTOR(S) : Adrian Smith et al.

It is certified that error appears in the above-identified patent and that said Letters Patent is hereby corrected as shown below:

In Claim 1, Line 42, Column 12, "...arid..." should read --...and...--

In Claim 21, Line 26, Column 14 "...anode..." should read --...a node...--

In Claim 21, Line 29, Column 14 "...nod..." should read --...node...--

In Claim 21, Line 31, Column 14, "...traffic and..." should read --...traffic, and...--

Signed and Sealed this

Tenth Day of July, 2007

JON W. DUDAS
*Director of the United States Patent and Trademark Office*